United States Patent
Nagahama et al.

[11] Patent Number: 5,305,565
[45] Date of Patent: Apr. 26, 1994

[54] FLOOR MAT WITH PREVENTION OF WAVING

[75] Inventors: Yuji Nagahama, Suita; Tetsuo Miyake, Tsu, both of Japan

[73] Assignee: Duskin Co., Ltd., Osaka, Japan

[21] Appl. No.: 699,642

[22] Filed: May 14, 1991

[51] Int. Cl.$^5$ .................... E04F 15/00; B32B 33/00
[52] U.S. Cl. .................................. 52/177; 428/95
[58] Field of Search ............. 52/177, 309.1, 309.4, 52/396; 428/95

[56] References Cited

U.S. PATENT DOCUMENTS

| | | | |
|---|---|---|---|
| 3,306,808 | 2/1967 | Thompson et al. | 428/95 |
| 3,661,691 | 5/1972 | Slosberg | 428/95 |
| 3,811,922 | 5/1974 | Clark et al. | 428/96 |
| 4,886,692 | 12/1989 | Kerr et al. | 52/177 X |
| 5,108,094 | 4/1992 | Quinn et al. | 52/177 X |
| 5,190,799 | 3/1993 | Ellingson, III | 52/177 X |
| 5,198,278 | 3/1993 | Sumimoto | 428/95 |
| 5,227,214 | 7/1993 | Kerr et al. | 428/95 |

FOREIGN PATENT DOCUMENTS

| | | | |
|---|---|---|---|
| 513449 | 11/1992 | European Pat. Off. | 428/95 |
| 61-266237 | 11/1986 | Japan | 52/177 |
| 62-137029 | 6/1987 | Japan | 52/177 |
| 3201 | of 1908 | United Kingdom | 52/177 |
| 465518 | 3/1937 | United Kingdom | 52/177 |

*Primary Examiner*—Rodney M. Lindsey
*Attorney, Agent, or Firm*—Sherman and Shalloway

[57] ABSTRACT

By introducing an expanded structure into a rubber portion during heating under pressure at the time of integrating a mat, and by using as a backing of a carpet a foamed rubber sheet having an expansibility of 1.2 to 3 times and a skin layer having a thickness of 0.1 to 1.0 mm, the shrinkage of the mat by shrinking, washing and drying after heating under pressure can be relaxed, and the waving of the mat can be prevented effectively. At the same time, the mat of the invention has excellent fitness to a floor surface, light-weight, strength and heat resistance.

7 Claims, 3 Drawing Sheets

STEP (A)

STEP (B)

STEP (C)

FLOOR MAT WITH PREVENTION OF WAVING

BACKGROUND OF THE INVENTION

1. Field of the Invention

This invention relates to a floor mat, particularly used for dusting of shoe bottoms by being laid in an entrance or an inlet of housings and shops.

2. Description of the Prior Art

Many floor mats consist of a base cloth, piles tufted thereto and a backing of synthetic rubber fixing and tufted system. They are used as laid on an entrance and exit to prevent intrusion of dusts to indoors from outside in shops, housings and offices.

Backings of synthetic rubbers are generally integrated by laying tufted piles and an unvulcanized rubber sheet and heating them under pressure.

When a mat is made by such a method, the sizes of the original portion of the mat and a rubber portion are fixed at the time of heating under pressure, and after cooling, at ordinary temperature of use, the product gives rise to distortion from differences in the coefficient of linear expansion between the rubber and the fiber, or it remains as an internal stress. Consequently, the distortion appears as a dimensional change such as waving and curling.

In addition to the dimensional difference at the time of manufacturing a mat, a strain from the shrinkage (the rubber is difficult to shrink as compared with the fiber) of the fibers owing to repeated use (due to the repetition of washing and drying) is added. A complex strain occurs on the whole mat, causing waving and curling. Since these shorten the life of the rental mat, this poses a great problem.

SUMMARY OF THE INVENTION

It is an object of this invention to provide an integrated mat by reducing the dimensional difference between the fibers and the rubber which occurs by heating under pressure at the time of producing these mats, preventing the occurrence of waving and curling owing to the repeated use of the mat, and decreasing the weight of the mat which becomes a problem in such a rubber-backed integrated mat.

According to this invention, there is provided a floor mat resistant to of waving composed of a base cloth, a mat pile tufted to the base cloth, and a rubber sheet integrated onto the back surface of the base cloth, the mat being formed by integrating an unvulcanized rubber sheet having a low foamability and the tufted mat under heat and pressure and vulcanizing and expanding the rubber sheet, the rubber sheet having an expansion factor of 20 to 200% and bearing a skin layer with a thickness of 0.1 to 1.0 mm.

In the present invention, the stability of the mat and the effect of preventing turning over can be increased by disposing a frame-like solid rubber in the marginal edge of a foamed rubber sheet.

DETAILED DESCRIPTION OF THE INVENTION

The floor mat of this invention is composed of, as in a known mat, a base cloth, a mat pile tufted to the back surface (non-pile surface) of the base cloth, and is characterized markedly in that an unvulcanized rubber sheet of low foamability and a tufted mat are integrated under heat and pressure and this rubber sheet is vulcanized and foamed, and that this rubber sheet is expanded at a low foamability of 20 to 200% and bearing a skin layer with a thickness of 0.1 to 1.0 mm.

Figure 1:
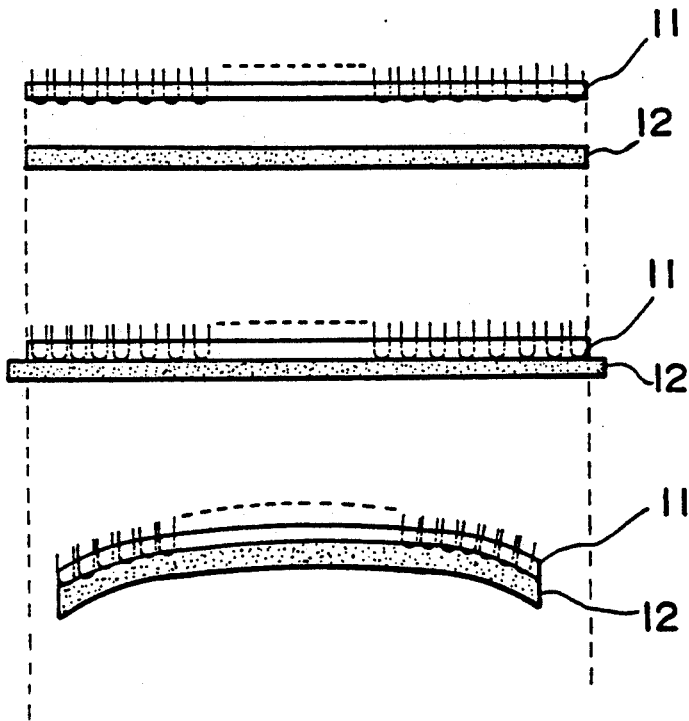
FIG. 1 is a schematic view in cross section illustrating dimensional changes in each step of forming an integrated mat in the prior art.

In FIG. 1 illustrating dimensional changes in each step of forming an integrated mat in the prior art, an original cloth 11 made by tufting piles to the base cloth is superimposed on a rubber sheet 12 in step (A). The superimposed material superimposed in step (B) is heated under pressure to integrate the rubber sheet by bonding them. Finally, in step (C), at the time of pressing, the rubber sheet is thermally expanded to adhere and fix the fibers and the rubber, and then, the product is cooled. The difference between thermal shrinkage of the rubber and the thermal shrinkage of the original cloth causes waving, curling and internal stress of the mat (initial state). Thus by making the dimension at the time of pressing as a standard, the difference in the amount of shrinkage which causes waving is expressed by the formula Difference of shrinkage (S) = Thermal Shrinkage length of the rubber-thermal shrinkage length of the original cloth.

By thereafter repeatedly using the rental mat, shrinkage of the fibers is developed by the recycling step such as washing and drying. Since the shrinkage of the rubber is less than the fibers in a recycling step of washing and drying, the difference further increases.

Figure 2:
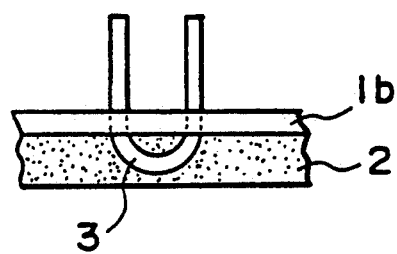
FIG. 2 is a cross section of the pile mat attached to the foamed rubber sheet the shrinkage in a recycle step.

FIG. 2 illustrates the shrinkage of the recycling step. In this shrinking, the two relative related acts are shown by ① the base cloth $1b$ and ② the rubber 2+pile backstitch 3. The product is considered to act like a bimetal, and the backstitch shrinks along the length of the fibers. As a result, the shrinkage of the backstitch of the pile by repeated use is added to the shrinkage (heat) at the time of the mat production, and the relative difference of the base cloth $1b$ becomes large.

Thus, after the recycling step, the difference (R) of the amount of shrinkage is expressed by R=S−{the shrinkage length of the base cloth−(the shrinkage length of the rubber after washing−the shrinkage length of the pile stitch)}.

In a conventional integrated mat, waving and curling occur as a result of these two factors, and to use it as a rental mat stably for a long perod of time, a problem exists.

In the present invention, the shrinkage behavior of the mat-constituting materials are considered and a foamed structure is introduced into the rubber portion by heating under pressure at the time of integration of the mat. Thus, shrinking at the time of washing after heating under heat and pressure and shrinking of the mat by drying have been successfully moderated. This led to a rubber backed mat having no waving. As a subsidiary effect, when the rubber sheets having the same thickness is used, a relatively lighter product as compared with a solid rubber type can be obtained. As a rental mat, the cleaning cost can be decreased. The reason therefor will be mentioned.

As shown by the Law of Boyle and Charles, a closed gas generally is "expanded in volume by heating" and "its volume decreases by pressure." These varying amount are shown by the following formula when a gas is regarded as an ideal amount.

$$PV = nRT \text{ or } \frac{P_1 V_1}{T_1} = \frac{P_2 V_2}{T_2}$$

wherein $P$, $P_1$ and $P_2$ are the pressure of the gas, $V$, $V_1$ and $V_2$ are the volume of the gas, $T$, $T_1$ and $T_2$ are the temperature (°K) of the gas, $R$ is a constant of the gas, and $n$ is the mole number of the gas, holds good.

Thus, the volume of the air cells in the rubber sheet varies, depending upon the temperature and pressure as shown by the above formula. On the other hand, in the rubber sheet and fibers, although a volume change by applying pressure can be neglected, there is a volume change (dimensional change) caused by heating as stated above. Polyester fibers, nylon fibers, acrylic fibers, vinylon fibers and natural fibers such as cotton have an inherent coefficient of linear expansion. They are however smaller than that of rubber (in the case of NBR, it is $13-20 \times 10^{-5} °C^{-1}$).

In the foamed rubber-backed mat of this invention, the pressure is, as a result, reduced to normal pressure in adhering rubber/fibers. By utilizing the pressure difference, the air cells in the rubber can be increased in volume and the imbalanced shrinkage of the mat as a whole can be prevented. As a result, waving can be prevented. In detail, as compared with the thermal shrinkage of the rubber, the thermal shrinkage of the air cells and shrinkage of the fibers by washing, the expansion of air cells having a large volume change is utilized, the imbalance of shrinkage can be removed.

Generally, as compared with a general rubber backing mat, by carrying out a foaming reaction simultaneously with the thermal expansion of the rubber, the gas is maintained in the rubber in a closed state during heating under pressure to fix the rubber to the fibers. Thereafter, when the temperature is returned to normal temperature and the pressure to normal pressure, the rubber portion is expanded (the expansion of the gas) according to the pressure difference to give a mat in which curling and waving as a result of use is prevented.

Figure 3:
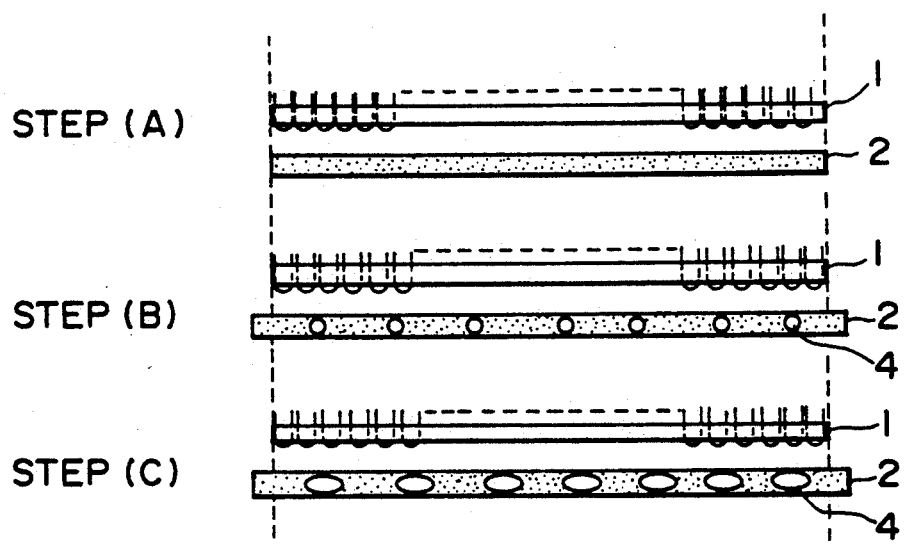
FIG. 3 is a cross section showing the process of producing the mat of the invention.
Figure 4:
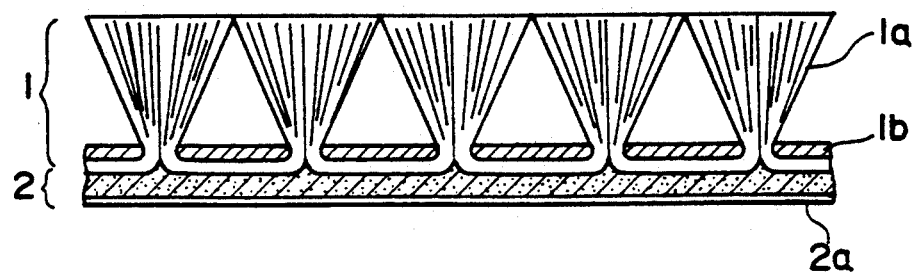
FIG. 4 is a cross section showing of the invention.

FIG. 3 illustrates the production of the mat of this invention. In step (A) an original cloth 1 obtained by tufting a pile to a base cloth is superimposed on a low foamable rubber sheet 2 containing a blowing agent and a vulcanizer, and in the step (B) they are overlaid and heated under pressure to perform integration by bonding them vulcanization and foaming of the rubber sheet are carried out. At this time, air cells 4 are formed in the rubber sheet 2. Finally, in the step (C), the backed mat is cooled. By performing the thermal shrinkage (the thermal shrinkage of the rubbers volume expansion by the reduction of the pressure) between the step (B) and step (C) an ordinary curling of a rubber-backed mat can be prevented.

The foamed state may be continuous cell forming or single cell forming. The method of production for preventing curling may be arbitrarily selected from the pressurization, the content (cell expansion ratio) and the coefficient of linear expansion of the rubber.

The floor mat of this invention, as shown in FIG. 2, is obtained by backing a foamed rubber sheet 2 to the back surface of a pile carpet 1, and is characterized in that the foamed rubber sheet 2 has a expansion ratio of 20 to 200%, and the thickness of the skin layer 2a is 0.1 to 1.0 mm. In the drawing 1a represents a cut pile, and 1b is a base cloth formed of a woven or a non-woven cloth.

Figure 5:
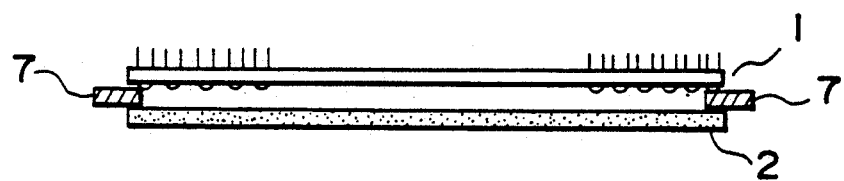
FIG. 5 is a cross section of another embodiment of the invention.

In the present invention, as shown in FIG. 5, by disposing a frame-like solid rubber 7 in the outer circumferential portion of the foamed rubber sheet 2, only the outer circumferential portion can be shrunk as compared with a central portion. Consequently the weight of the circumferential portion can be increased. Thus, it is possible to increase the stability of the mat and prevent turning over.

The foamed rubber sheet may be natural or synthetic rubber, but nitrile-butadiene rubber (NBR) is preferred. NBR has excellent mechanical strength, thermal resistance, oil resistance and weatherability. Because of its strong hydrogen bond by the nitrile group, it has great maintenance of cells, and even in a recycle step of drying and washing, a foamed structure is maintained stably. This leads to the advantage that an excellent waving preventive effect and fitness to the floor can be obtained.

The preferred thickness of the foamed rubber sheet is 0.5 to 2.0 mm. The floor mat of this invention can be produced by forming a sheet from a rubber composition of the natural or synthetic rubber including a blowing agent, overlaying a pile carpet on this sheet and interposing them between hot plates, heating them under a pressure of 3 to 5 kg/cm² and at 150° to 170° C. for 10 to 20 minutes, and performing vulcanization and blowing. The blowing agent used at this time is preferably low odorizing such as azodicarboamide, p-toluene sulfonyl hydrazide. The amount of the blowing agent is preferably 0.1 to 5.0 parts by weight. The back surface of the pile carpet may be coated with an ethylene vinyl copolymer to enhance its adhesion to the foamed rubber sheet. At the time of interposing the rubber sheet and the pile carpet with the hot plates, a fibrous sheet may be interposed between the hot plates.

EXAMPLE 1

By using a rubber composition having the composition of Table 1, an unvulcanized rubber sheet was molded.

TABLE 1

| material | parts by weight |
|---|---|
| Rubber (NBR) | 100 |
| Zinc oxide | 5 |
| Stearic acid | 1 |
| Dioctyl phthalate | 15 |
| SRF carbon | 60 |
| Wax | 1 |
| Sulfur | 1.5 |
| Thiazole-type vulcanization acceleration promoter | 1.5 |
| Thiura-type acceleration promotor | 0.4 |
| Blowing agent | 1.5 |

(The blowing agent was a mixture of azo carbonamide and dinitrosopentamethyltetramine, tradename "Ecceler Q25").

Figure 6:
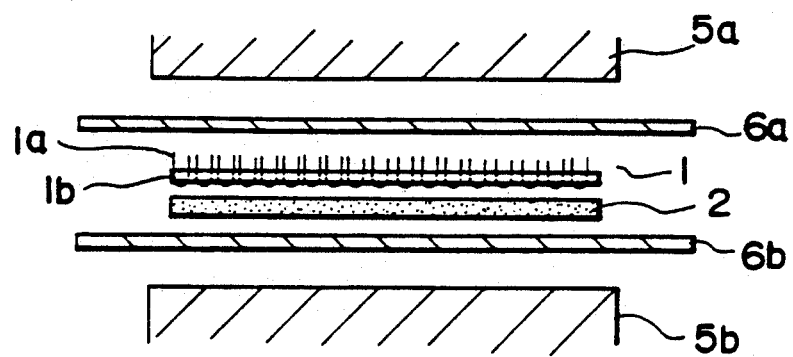
FIG. 6 is a cross section showing the method of pressing of the mat for example.

As shown in FIG. 6, bulked continuous filaments of nylon (BCF nylon) yarn was tufted to a base cloth 1b of a polyester non-woven fabric to form a cut pile 1a having a height of 10 mm. An ethylene vinyl acetate copolymer was coated on the back surface of the base cloth 1b to prepare a pile carpet 1. This pile carpet 1 was placed on the unvulcanized rubber sheet 2. These materials were interposed between hot plates 5a and 5b through embossing fibrous sheets 6a and 6b vulcanized under a pressure of 4 kg/cm² at 160° C. for 15 minutes to obtain the floor mat of the invention. The foamed rubber sheet 2 of the floor mat had an expansion factor of 1.7 times. The skin layer 2a had a thickness of 0.2 mm and a total thickness of 1.7 mm. The resulting mat had a total weight of 2360 g/m² and had good fitness. When this mat was subjected to a washing test no change was seen after being washed 20 times as compared with a conventional product having a solid rubber backing, which becomes about 25% lighter. The product had increased durability and a washing increased to at least 7 times as compared with a conventional product having foamed vinyl chloride sheet.

EXAMPLE 2

Three unvulcanized rubber sheets having a thickness of 1.0 mm and a foaming factor of 0%, 50% (containing 1.5 parts of the blowing agent) and 100% (containing 3.0 parts) were prepared from the composition 1 having the composition. These unvulcanized rubber sheets were vulcanized by using a mold under a pressure of 3 kg/cm² at 160° C. for 30 minutes. The sheets were cooled to 20° C., and their dimensions were measured. The results were shown in Table 2.

TABLE 2

| Expansion factor | Unvulcanized | After vulcanization |
| --- | --- | --- |
| 0% | 100 cm | 97.4 cm |
| 50% | " | 111.1 cm |
| 100% | " | 117.9 cm |

The rubber sheets changed dimensionally depending on the amount of air present.

EXAMPLE 3

Three rubber sheets A, B and C and the following original mat were vulcanized by using hot plates 5a and 5b as shown in FIG. 6 through fibrous sheets 6a and 6b under the conditions shown in Table 3 to prepare rubber sheet backed mats Ⓐ, Ⓑ and Ⓒ.

| Mat original | |
| --- | --- |
| Pile | nylon-6, 1300 d/2 ply stitch 6, pile height 9 mm Gauge 5/32 Unit weight 880 g/m² |
| Base cloth | Polyester non-woven fabric 100 g/m² |
| Size | 1430 mm × 880 mm |
| (Rubber sheet A) | |
| Rubber composition: | the rubber described in Table 1 was used |
| Expansion factor: | 50% (1.5 times) |
| Sheet thickness: | Before foaming 1 mm, After foaming 1.5 mm |
| Weight: | 1230 g/m² |
| Vulcanization: | 150° C., 20 minutes |
| Pressurizing method: | By the method shown in FIG. 6, a pressurizing method is carried out |

| -continued | |
| --- | --- |
| Mat original | |
| | under 2 kg/cm² |
| Size: | 1450 mm × 900 mm |
| (Rubber sheet B) | |

The rubber sheet B, as shown in FIG. 5, was composed of a central rubber sheet 2 and a frame-like peripheral rubber sheet 7. The central portion and the outer peripheral portion were superimposed by 20 mm. The peripheral rubber sheet was protruded outwardly 10 cm from the central portion.

Rubber composition: The rubber shown in cable 1 at the central portion and the peripheral portion (the peripheral portion did not contain a blowing agent)

Expansion ratio; the central portion 100% (2 times), the peripheral portion 0% (not foamed) Sheet thickness: the Central portion 1.0 mm, before foaming 1.0 mm, after foaming 2.0 mm the peripheral portion 2.0 mm

| Weight: | The central portion 1230 g/cm², the peripheral portion 340 g |
| --- | --- |
| Vulcanization condition: | 160° C., 30 minutes |
| Pressurization method: | By the method shown in FIG. 6, pressurization was carried out under 3 kg/cm². |
| Size: | 1450 mm × 900 mm |
| (Rubber sheet C) | |
| Rubber composition: | The rubber shown in Table 1 was used (but not containing a blowing agent) |
| Expansion factor: | 0% |
| Sheet thickness: | 1.5 mm |
| Weight: | 1845 g/m² |
| Vulcanization conditions: | 160° C., 20 minutes |
| Pressurization Method: | By the method shown in FIG. 6, pressurization was carried out under 3 kg/cm² |
| Size: | 1450 mm × 900 mm |

The mats produced under the above conditions were laid for 3 days in a place where the pedesteians were 3000 persons/day. Then, the integrated mats were washed and regenerated in a customary manner.

After repeating this operation 40 times, the number of waving and the height were measured. At the same time, the poor parts in outer appearance, the breakage of the selvage, and wear were ascertained at the same time. The results are shown in Table 4.

TABLE 4

| | Mat A | Mat B | Mat C |
| --- | --- | --- | --- |
| Waving | | | |
| Washing 20 times | 0 | 0 | 6 mm × 4 10 mm × 2 |
| Washing 40 times | 5 mm × 2 | 0 | 10 mm × 6 12 mm × 3 |
| Breakage of the selvage and wearing | no problem | no problem | no problem |
| Mat weight | 2880 g | 3120 g | 3640 g |
| Lighter rate as compared with C | 21% | 14% | 0 |

In comparison with Ⓒ, both Ⓐ and Ⓑ had less waving and Ⓑ showed no waving. In the mat Ⓒ there occurred many wavings, and during passage, the mat caught the feet and problems may be posed. This was very unsightly.

Defects such as wearing was not seen in the rubber portion of the back surface. No problem was noted in physical properties on the foamed rubber sheet.

As can be seen from Examples, in the present invention, the shrinkage of the mats by shrinkage, washing and drying after heating and pressure can be relaxed, and waving could be effectively prevented as compared with a conventional high heat resistance were elevated and the washability was greatly increased. The life of the mat can be prolonged. Furthermore, fitness to a floor surface was excellent. As compared with a conventional solid rubber sheet backed mat, the total mat weight was very light. Thus, the mat of the invention was easy to handle. As a rental mat, the cleaning cost could be reduced.

What is claimed is:

1. A floor mat which is resistant to waving comprising:
    a base cloth;
    a mat pile tufted to the base cloth forming a tufted mat; and
    a low foamed rubber sheet integrated onto the back surface of the base cloth, said mat being formed by integrating an unvulcanized rubber having a low foamibility and the tufted mat under heat and pressure and vulcanizing and expanding the rubber sheet, wherein the resulting low foamed rubber sheet has an expansion factor of 20 to 200% and a skin layer having a thickness of 0.1 to 1.00 mm.

2. The floor mat of claim 1, wherein the rubber sheet comprises said low foamed rubber sheet at its central portion and a frame-like solid rubber sheet at its peripheral portion.

3. The floor mat of claim 1 or 2 wherein the rubber sheet is a nitrile-butadiene rubber (NBR).

4. The floor mat of claim 1, wherein the base cloth is formed from a non-woven cloth.

5. The floor mat of claim 1, wherein the base cloth is formed from a woven cloth.

6. The floor mat of claim 1, wherein the foamed rubber sheet has a thickness of from 0.5 to 2.0 mm.

7. The floor mat of claim 6, further comprising an ethylene vinyl copolymer coating on the back surface of the base cloth so as to enhance the adhesion of the base cloth to the foamed rubber sheet.

* * * * *